(12) United States Patent
Dinerstein et al.

(10) Patent No.: US 10,896,356 B2
(45) Date of Patent: Jan. 19, 2021

(54) EFFICIENT CNN-BASED SOLUTION FOR VIDEO FRAME INTERPOLATION

(71) Applicant: SAMSUNG ELECTRONICS CO., LTD., Suwon-si (KR)

(72) Inventors: Michael Dinerstein, Rehovot (IL); Tomer Peleg, Kfar Saba (IL); Doron Sabo, Petah-Tikva (IL); Pablo Szekely, Rehovot (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 68 days.

(21) Appl. No.: 16/409,142

(22) Filed: May 10, 2019

(65) Prior Publication Data

US 2020/0356827 A1 Nov. 12, 2020

(51) Int. Cl.
G06K 9/68 (2006.01)
G06K 9/00 (2006.01)
G06K 9/62 (2006.01)
G06T 7/246 (2017.01)
G06T 3/00 (2006.01)

(52) U.S. Cl.
CPC ....... *G06K 9/6857* (2013.01); *G06K 9/00744* (2013.01); *G06K 9/6232* (2013.01); *G06K 9/6256* (2013.01); *G06T 3/0093* (2013.01); *G06T 7/248* (2017.01); *G06T 2207/10016* (2013.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| 2016/0300111 A1* | 10/2016 | Cosatto | G06K 9/00718 |
| 2019/0096046 A1* | 3/2019 | Kalantari | G06N 3/0454 |
| 2019/0124346 A1* | 4/2019 | Ren | H04N 19/146 |
| 2020/0012940 A1* | 1/2020 | Liu | H04N 7/0135 |

OTHER PUBLICATIONS

Jiyang Yu, "Robust Video Stabilization by Optimization in CNN Weight Space", Proceedings of the IEEE/CVF Conference on Computer Vision and Pattern Recognition (CVPR), Jun. 2019, pp. 3800-3806.*

(Continued)

*Primary Examiner* — Omar S Ismail
(74) *Attorney, Agent, or Firm* — F. Chau & Associates, LLC (57) ABSTRACT

A system of convolutional neural networks (CNNs) that synthesize middle non-existing frames from pairs of input frames includes a coarse CNN that receives a pair of images acquired at consecutive points of time, a registration module, a refinement CNN, an adder, and a motion-compensated frame interpolation (MC-FI) module. The coarse CNN outputs from the pair of images a previous feature map, a next feature map, a coarse interpolated motion vector field (IMVF) and an occlusion map, the registration module uses the coarse IMVF to warp the previous and next feature maps to be aligned with pixel locations of the IMVF frame, and outputs registered previous and next feature maps, the refinement CNN uses the registered previous and next feature maps to correct the coarse IMVF, and the adder sums the coarse IMVF with the correction and outputs a final IMVF.

20 Claims, 9 Drawing Sheets

(56) References Cited

OTHER PUBLICATIONS

Tomer Peleg,"IM-Net for High Resolution Video Frame Interpolation",Proceedings of the IEEE/CVF Conference on Computer Vision and Pattern Recognition (CVPR), Jun. 2019,pp. 2398-2403.*

Simon Niklaus,"Context-aware Synthesis for Video Frame Interpolation",Proceedings of the IEEE Conference on Computer Vision and Pattern Recognition (CVPR),Jul. 2019,p. 670-677.*

Yeong-Doo Choi,"Motion-Compensated Frame Interpolation Using Bilateral Motion Estimation and Adaptive Overlapped Block Motion Connpensation",IEEE Transactions on Circuits and Systems for Video Technology, vol. 17, No. 4, Apr. 2007,pp. 407-408,412-413.*

Shangshu Qian,"Frame Interpolation Using Deep Pyramid Flow",2018 26th International Conference on Geoinformatics,Jun. 28-30, 2018,pp. 1-4.*

* cited by examiner

EFFICIENT CNN-BASED SOLUTION FOR VIDEO FRAME INTERPOLATION

TECHNICAL FIELD

Embodiments of the present disclosure are directed to methods for video processing

DISCUSSION OF THE RELATED ART

In video frame interpolation (VFI), middle non-existing frames are synthesized from the original input frames. A classical application requiring VFI is frame rate up-conversion for handling issues like display motion blur and judder in LED/LC displays. Other applications include frame recovery in video coding and streaming, slow motion effects and novel view synthesis.

Conventional approaches to VFI, which include carefully hand engineered modules, typically include the following steps: bi-directional motion estimation, motion interpolation and occlusion reasoning, and motion-compensated frame interpolation (MC-FI). Such approaches are prone to various artifacts, such as halos, ghosts and break-ups due to insufficient quality of any of the components mentioned above.

In the past few years, deep learning and specifically convolutional neural networks (CNNs) have emerged as a leading method for numerous image processing and computer vision tasks. VFI processes can benefit from the use of these cutting-edge techniques, such as replacing some of the steps in the VFI's algorithmic flow with one or more pre-trained CNNs.

SUMMARY

Exemplary embodiments of the present disclosure are directed to systems and methods for synthesizing middle non-existing frames from pairs of input frames in a given video. In contrast to conventional approaches for VFI, embodiments of the disclosure focus on designing a CNN-based framework that retains simple hand-crafted modules and replaces more sophisticated components by CNNs which have been pre-trained on a large set of examples. Methods according to embodiments of the disclosure can reduce the level of halo, ghost and break-up artifacts, which are typical for conventional solutions. Moreover, by choosing a well-balanced mixture of conventional and CNN-based components, a method according to an embodiment of the disclosure can be efficiently implemented on various platforms, ranging from GPUs, through neural processors, to dedicated hardware.

According to an embodiment of the disclosure, there is provided a system that uses convolutional neural networks (CNNs) to synthesize middle non-existing frames from pairs of input frames in a given video, comprising a coarse convolutional neural network (CNN) that receives a pair of images acquired at consecutive points of time, wherein the pair of images includes a previous image and a next image, a registration module connected to the coarse CNN, a refinement CNN connected to the registration module and the coarse CNN, an adder connected to the refinement CNN and the coarse CNN; and a motion-compensated frame interpolation (MC-FI) module connected to the adder and the coarse CNN. The coarse CNN outputs a previous feature map and a next feature map from the previous image and the next image, a coarse interpolated motion vector field (IMVF) and an occlusion map from the pair of images, the registration module uses the coarse IMVF to warp the previous and next feature maps to be aligned with pixel locations of the IMVF frame, and outputs a registered previous feature map and a registered next feature map, the refinement CNN uses the registered previous feature map and a registered next feature map to correct the coarse IMVF, and the adder sums the coarse IMVF with the correction to the IMVF and outputs a final IMVF.

According to a further embodiment of the disclosure, the motion-compensated frame interpolation (MC-FI) module generates an interpolated frame corresponding to a time between the time points of the previous frame and the next frame by warping the previous image and the next image using the final IMVF and performing a weighted blending of the warped previous and next images using occlusion weights from the occlusion map.

According to a further embodiment of the disclosure, the coarse CNN receives the pair of images in a plurality of resolution levels. The coarse CNN includes a feature extraction sub-network that generates a pair of feature maps that correspond to each image of the pair of images at each level of resolution, an encoder-decoder sub-network that concatenates the pair of feature maps at each level of resolution into a single feature map and processes the single feature map to produce a new feature map with downscaled spatial resolution, a fusion sub-network that merges the new single feature maps at each level of resolution into a single merged feature map by performing a weighted average of the feature maps for each level of resolution where the weights are learned in a training phase and differ for each pixel, and an estimation sub-network that outputs horizontal and vertical components of the coarse IMVF and an occlusion map. The feature extraction sub-network includes Siamese layers.

According to a further embodiment of the disclosure, the estimation sub-network includes a horizontal sub-module, a vertical sub-module and an occlusion map sub-module, where each sub-module receives the merged feature map output from the fusion sub-network. The horizontal and vertical sub-modules respectively output a horizontal probability map and vertical probability map with S probability values per pixel in each probability map. Each probability value represents a probability for a motion vector to be one of S displacement values for that pixel. The horizontal and vertical sub-modules respectively calculate a first moment of the probability values for each pixel to determine expected horizontal and vertical components for each pixel, where the pairs of expected horizontal and vertical components for each pixel comprise the coarse IMVF.

According to a further embodiment of the disclosure, the occlusion map sub-module outputs the occlusion map which includes per-pixel weights for performing a weighted average between the previous image and the next image.

According to a further embodiment of the disclosure, the refinement CNN includes an encoder-decoder sub-network that concatenates the registered previous feature map and the registered next feature map and outputs a new set of feature maps with spatial resolution resized with respect to a full resolution of the previous image and the next image, and an estimation sub-network that estimates corrections to the horizontal and vertical components of the coarse IMVF for each block in the registered next and previous feature maps to output the corrected IMVF.

According to a further embodiment of the disclosure, the estimation sub-network includes a horizontal sub-module and a vertical sub-module. The horizontal and vertical sub-modules respectively output a horizontal probability map and vertical probability map with S probability values per pixel in each probability map, where each probability value represents a probability for a motion vector to be one of S displacement values for that pixel. The horizontal and vertical sub-modules respectively calculate a first moment of the probability values for each pixel to determine expected horizontal and vertical components for each pixel, where the pairs of expected horizontal and vertical components for each pixel comprise the correction to the IMVF.

According to another embodiment of the disclosure, there is provided a method of using convolutional neural networks (CNNs) to synthesize middle non-existing frames from pairs of input frames in a given video, including receiving a pyramid representation of a pair of consecutive input frames, wherein the pair of consecutive input frames includes a previous image and a next image, wherein the pyramid representation includes a plurality of pairs of input frames, each at a different spatial resolution level; generating a pair of feature maps from each resolution level of the pyramid representation and estimating a coarse interpolated motion vector field (IMVF) and an occlusion map from each pair of feature maps; registering pairs of feature maps at the same resolution level according to the coarse IMVF and the occlusion map by warping each feature map of the pair of feature maps to be aligned with pixel locations of the coarse IMVF and outputting a registered previous feature map and a registered next feature map; correcting the coarse IMVF using the registered previous feature map and the registered next feature map to generate a correction to the IMVF; adding the correction to the IMVF to the coarse IMVF to generate a refined IMVF; and producing a synthesized middle frame from the pair of consecutive input frames, the refined IMVF and the occlusion map.

According to a further embodiment of the disclosure, generating a pair of feature maps includes generating a pair of features maps for each of the plurality of pairs of input frames at each spatial resolution, where each pair of features maps has a spatial resolution downscaled with respect to a resolution of the pair of input frames; concatenating the feature maps at each resolution level and processing the concatenated feature maps to generate a new set of feature maps with downscaled spatial resolution with respect to a resolution of the pair of consecutive input frames, merging the new set of feature maps for all spatial resolution levels into a single merged feature map by performing a weighted average of the feature maps for each level of resolution wherein the weights are learned in a training phase and differ for each pixel; and estimating for each block in the merged feature map horizontal and vertical components of the coarse IMVF, and an occlusion map, where the occlusion map includes per-pixel weights for performing a weighted average between the previous image and the next image.

According to a further embodiment of the disclosure, estimating horizontal and vertical components of the coarse IMVF includes generating a horizontal probability map and vertical probability map with S probability values per pixel in each probability map, where each probability value represents a probability for a motion vector to be one of S displacement values for that pixel, and calculating a first moment of the probability values for each pixel to determine expected horizontal and vertical components for each pixel, wherein the pairs of expected horizontal and vertical components for each pixel comprise the coarse IMVF.

According to a further embodiment of the disclosure, the coarse IMVF includes two 2D maps of horizontal and vertical shifts directed from the IMVF to the next frame, and registering pairs of feature maps includes using the opposite values of these shifts to warp features from the previous frame to locations of an output frame, and using the horizontal and vertical shifts as is to warp the input features from the next frame to the locations of the output frame.

According to a further embodiment of the disclosure, registering pairs of feature maps further includes, when the registered previous feature map has an occluded region, replacing the occluded region in the registered previous feature map with a corresponding region of the registered next feature map, and when the registered next feature map has an occluded region, replacing the occluded region in the registered next feature map with a corresponding region of the registered previous feature map.

According to a further embodiment of the disclosure, correcting the coarse IMVF includes concatenating features of the registered previous feature map and the registered next feature map and processing the concatenated feature maps to generate a new set of feature maps with spatial resolution resized with respect to the full resolution; and estimating for each block in the coarse IMVF corrections to the horizontal and vertical components of the coarse IMVF to generate a correction to the IMVF.

According to a further embodiment of the disclosure, producing a synthesized middle frame includes warping the pair of consecutive input frames according to the refined IMVF; and performing a weighted blending of the pair of warped images using the occlusion weights to generate the synthesized middle frame.

According to a further embodiment of the disclosure, the method includes removing blockiness artifacts from motion boundaries by performing a weighted averaging of interpolated pixels in the synthesized middle frame using estimates from neighboring blocks.

According to another embodiment of the disclosure, there is provided a non-transitory program storage device readable by a computer, tangibly embodying a program of instructions executed by the computer to perform the method steps for using convolutional neural networks (CNNs) to synthesize middle non-existing frames from pairs of input frames in a given video.

DETAILED DESCRIPTION OF EXEMPLARY EMBODIMENTS

Exemplary embodiments of the disclosure as described herein generally provide systems and methods for using CNNs to synthesize middle non-existing frames from pairs of input frames in a given video. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Figure 1:
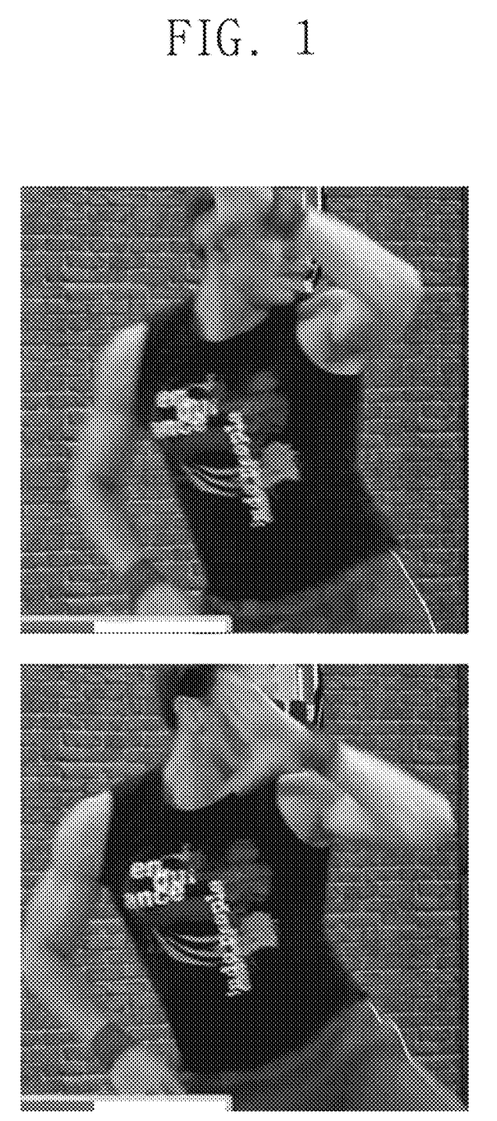
FIG. 1 illustrates a pair of consecutive input frames, according to embodiments of the disclosure.

FIG. 1 depicts a pair of consecutive input frames, in which the previous frame is on top and the next frame is on the bottom. In this example, the background remains static, whereas the left hand and the rest of the upper-body move each with a different motion vector.

Basic Assumptions

According to embodiments of the disclosure, linear motion between a pair of consecutive input frames is assumed. Specifically, this means that the motion from every pixel location in the estimated middle frame to the previous frame equals minus the motion from this location to the next frame.

Task Definition

Methods according to embodiments of the disclosure decompose the task of synthesizing the middle frame from a pair of two consecutive input frames into three steps:
1) Estimating the motion from each pixel location in the synthesized frame to its corresponding locations in each of the input frames. The set of motion vectors from all such pixel locations is regarded as the interpolated motion vector field (IMVF).
2) Classifying each pixel location in the synthesized frame into one of the following categories: 'closing', 'opening' or 'non-occluded'. The first means that this pixel location can be found only in the previous input frame, the second means that it can be found only in the next frame and the latter means that it can be found in both input frames. The map of these classification categories is regarded as the occlusion map.
3) Motion compensated warping of the input frames and weighted blending of the warped inputs according to the occlusion map, which serve as local weights for a blending procedure.

CNN-Based FrameWork for VFI

A system according to embodiments of the disclosure includes two CNNs and two conventional modules to handle registration and motion-compensated frame interpolation (MC-FI). A first, coarse CNN according to an embodiment estimates a coarse IMVF and occlusion map for each K×K block in the output interpolated frame. These estimates are used by a registration module to create a registered feature map that serve as input to a second CNN according to an embodiment, which refines the IMVF. The refined IMVF and the occlusion map are input into an MC-FI module that produces the interpolated middle frame.

Each of the two CNNs according to an embodiment plays a different role. A coarse CNN according to an embodiment can capture the most dominant motions in the scene, which are typically a composition of global motion and a set of simple rigid local motions. The coarse CNN can also discover occluded regions, mainly on motion boundaries. Using the coarse CNN's estimations for the IMVF and occlusion map, the input features extracted from these frames are warped. After this warping, inaccuracies and residual motion may still remain. A second, refinement CNN according to an embodiment operates on the warped input features and can correct inaccuracies and capture secondary motions.

Figure 2:
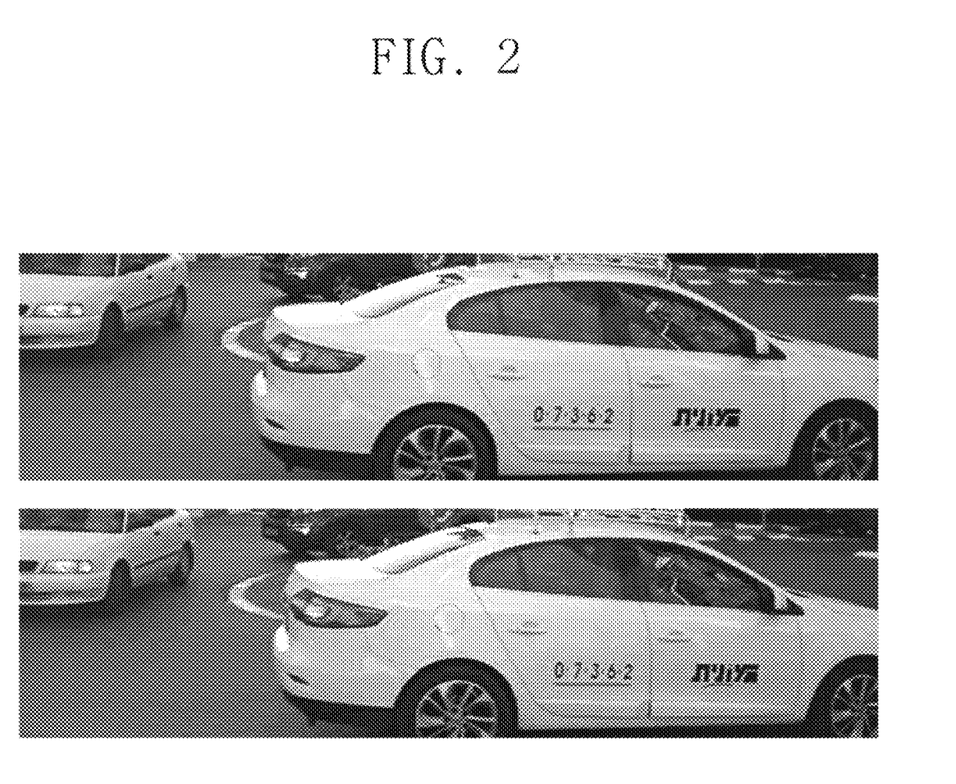
FIG. 2 illustrates a pair of consecutive input frames with complex motion, according to embodiments of the disclosure.

According to embodiments, breaking IMVF estimation into two steps is useful for scenes with complex motion. An example of a pair of input frames with complex motion is shown in FIG. 2, in which the previous frame is at the top and the next frame is at the bottom. The car located closest to the camera is moving to the right, its wheels are also spinning, while another car located further away from the camera is moving in a different direction. A coarse CNN according to an embodiment can capture the camera motion as well as the local motion of the car located closest to the camera. However, it is challenging to accurately capture at the same time the motion of the spinning wheels. This is the situation where a Refinement CNN according to an embodiment plays a role.

According to embodiment, the basic building blocks for constructing both CNNs include convolution, average pooling, bilinear up-sampling, concatenation, and soft-max layers; all are a common practice in the deep learning field. Using these building blocks, one can design the following types of sub-networks:
1. Feature extraction;
2. Encoder-Decoder,
3. Feature fusion; and
4. Estimation.

Each sub-network is constructed of specific layers, which include the following types:
(i) Convolution;
(ii) Average Pooling;
(iii) Concatenation;
(iv) Bilinear up-sampling;
(v) SoftMax; and
(vi) Center-of-Mass.

The first five types are a very common practice in the deep learning field. Note that each convolution layer that is not followed by a SoftMax layer comprises a non-linearity, typically a rectified linear unit activation. The last type is a linear operation in which the first moment of a given distribution is computed. The two CNNs according to embodiments are composed of some or all of these types of sub-networks. Each convolution layer in a neural network has its own set of parameters. The parameters of a convolution layer in a neural network include weights and bases. In a convolution layer the weights correspond to the coefficients of the 3D convolution kernel, and the biases are a set of offsets added to the results of a 3D convolution operation. For example, if a convolution layer uses a 3×3 filter support size, a pixel and the 3×3 grid of pixels around it are considered. Each one of these pixels is multiplied by a weight value and then all these weights are summed up. Then the bias is added and the value of one output feature produced. This is repeated for all pixel locations and for all output channels, where a different 3×3 filter and bias may be applied for each output channel. The weights and biases of the convolutional layers are learned when training the CNN. To learn the parameters of each CNN, a CNN is trained together with a given MC-FI module, so that an output frame is generated. This allows training the CNN in an end-to-end fashion using a dataset of frame triplets, where in each triplet the middle frame serves as ground truth for frame synthesis from the two other frames. Specifically, this means that ground truth for VFI can be readily obtained by sub-sampling videos.

Coarse CNN

A hierarchical coarse CNN according to an embodiment receives a pair of input frames at several resolutions, e.g.: level 0—full-resolution, level 1—downscaled by a factor of 2, Level 2—downscaled by a factor of 4, and so on. See FIG. 3 for an illustration of the image pyramids. To generate the image pyramid for each input frame, standard image resizing operations were used with factors of 2 (for Level 1) and 4 (for Level 2) per axis. These resizing operations are based on bilinear or bicubic interpolations. Each input goes through a same pair of layers with the same set of layer parameters. This pair of layers is typically referred to as Siamese layers. The Siamese layers produce a set of features maps per input, for an output of N values per pixel, with a factor of M reduction in the number of pixels per axis with respect to the input resolution. An exemplary, non-limiting value of N is N=25. As with the rest of the network, in this case the weights and biases are learned. Low-level features extracted from the Siamese layers of a CNN typically include strong responses on image edges and color representations.

Figure 3:
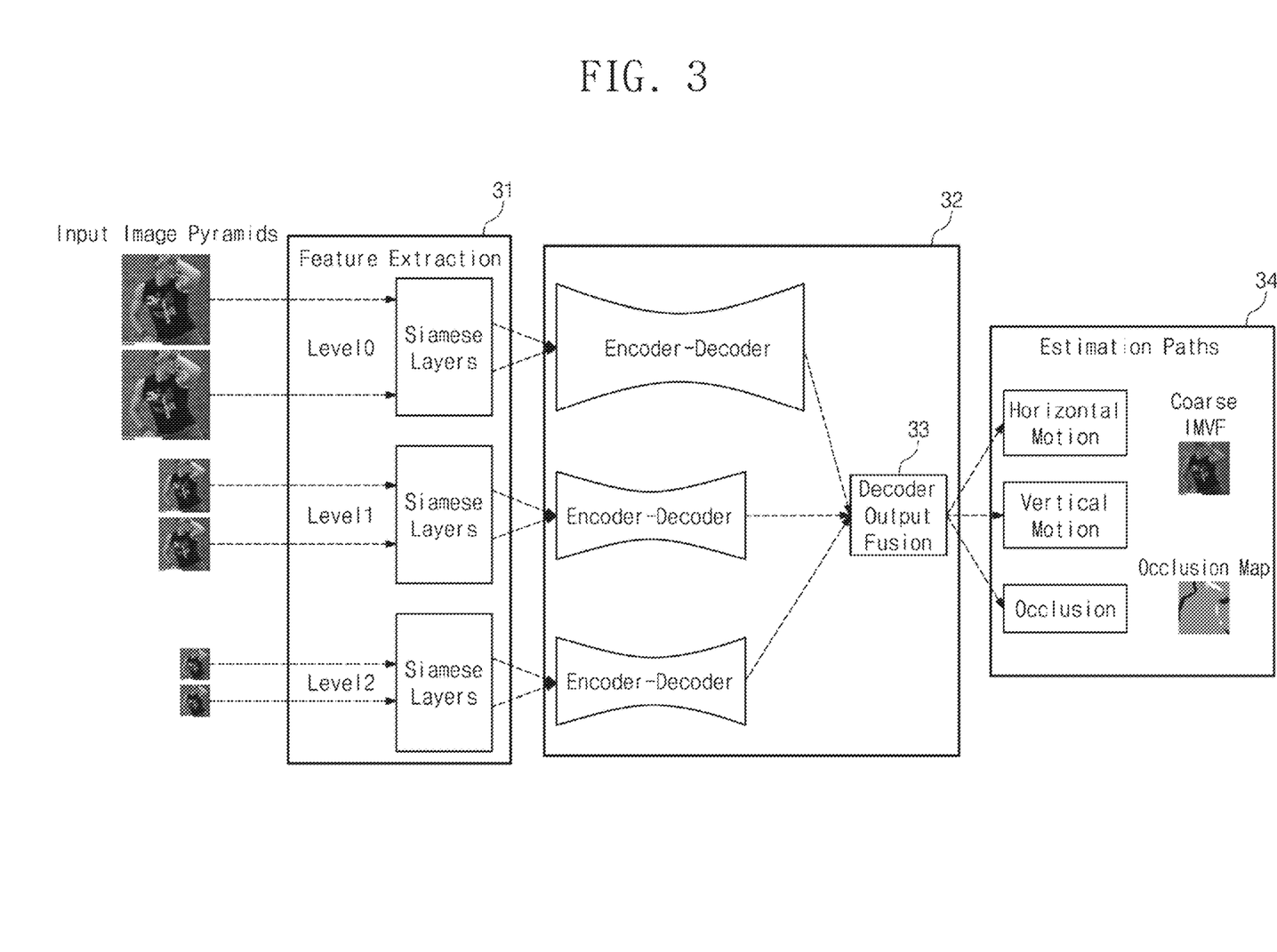
FIG. 3 illustrates an example of a coarse CNN with 3 pyramid levels, according to embodiments of the disclosure.

According to embodiments, the encoder-decoder sub-network is trained to extract features with increasing high-level context when moving from input to output. The output of the encoder-decoder is a 3D image, in which each spatial entry in this image is a high-dimensional representation. Each pair of feature maps taken from the same pyramid level in both input frames are concatenated and processed by encoder-decoder sub-network layers, resulting in a new set of feature maps with spatial resolution downscaled by L with respect to the full resolution. By concatenating is meant appending N feature channels from the second input frame to the N feature channels of the first input frame, yielding 2N feature channels overall. The 2N feature channels are passed as input to the encoder-decoder layers which yields an output with J values (channels) per pixel with factor of L reduction in the number of pixels per axis with respect to the input image. For example, in some embodiments, J=2N. The processing performed by a encoder-decoder sub-network is a deep cascade of convolution, average pooling and up-sampling layers. Each convolution layer is also followed by a nonlinearity unit, such as a rectified linear unit. Combined together, this sub-network according to an embodiment learns how to extract features with increasing high-level context as the processing moves from input to output. The output of the encoder-decoder is a 3D image, where each spatial entry in this image is a high-dimensional feature vector.

Then, according to an embodiment, the outputs of the all decoders are merged into a coarse IMVF in a locally adaptive fashion using a fusion sub-network. According to an embodiment, there are three encoder-decoder submodules, one for each level of resolution, and each yields an output with the same size: W×H/L×2N, where W and H are the width and height of the input frames in pixels. The fusion submodule takes these three outputs and combines them into a single output by performing a weighted average of the three inputs. The weights of this average are adaptive in the sense that they are learned and local in the sense that they are different for every pixel.

According to an embodiment, non-limiting values of L and M are L=8 and M=4. These values are basic properties of the architecture of a network, and are set by the number and structure of layers that change the spatial resolution within the CNN.

According to embodiments, the merged decoder output is input into estimation sub-network layers that estimate for each K×K block in the output image the horizontal and vertical components of the coarse IMVF, as well as the occlusion map. For example, in some embodiments, K=L. The coarse estimation layers include three sub-modules: a horizontal coarse IMVF sub-module, a vertical coarse IMVF sub-module and an occlusion map submodule, and each sub-module receives the output of the fusion sub-network. The horizontal and vertical coarse IMVF sub-modules each output a similar structure: a coarse horizontal and vertical probability map of size W/L×WL×S, i.e., S values for each pixel in the probability map. Each of the S probabilities per pixel represents the probability for a motion component to be one of S displacement values, e.g. for S=25, the displacements may be −96, −88, . . . 0, . . . 88, 96 in pixel units. For example, in some embodiments, S=N. Then, the first moment (center-of-mass) of this distribution is calculated for each pixel to determine the horizontal and vertical components of for each pixel. The pairs of expected values of the horizontal and vertical components for each pixel are the IMVF.

According to an embodiment, an estimation path for each of the horizontal/vertical motion component comprises a shallow cascade of convolution, soft-max and center-of-mass layers. The convolution layers process the output of the merged decoder outputs so that it will match the specific estimation task in hand. The soft-max layer converts the outputs of the last convolution layer to normalized discrete probability vectors, with one probability vector for each spatial location. Each of the motion estimation paths uses S classes, each corresponding to a specific motion value. The center-of-mass layer computes the first moment of each the probability distribution and thus converts the probability vectors into an expected motion value.

According to an embodiment, when creating a new intermediate frame, the previous and next frames are separately registered according to the IMVF, after which they are combined into a single frame. This is done using the occlusion map, which comprises per-pixel weights for performing weighted average between the previous and next frames. The per-pixel occlusion weights are computed via a separate estimation path. Similar to the motion estimation paths, a shallow cascade of convolution and soft-max layers is applied to the merged decoder outputs. In this estimation path there are two classes—"covering" and "uncovering". The occlusion weights are computed by taking the probability of the first class. When the value of the occlusion map is 0.5, then the pixels from the previous and next frames are averaged with equal weights. When the value of the occlusion map is 1 only the previous frame pixel is used, and when the value of the occlusion map is 0 only the next frame pixel is used. These values of 0 and 1 are used in case of occlusions. For example if a ball moves between two frames, the pixels that were behind the ball in the previous frame are now visible, and when performing the interpolation, only some of the pixels from the next image (the now exposed new pixels) and only some of the pixels from the previous frame—the pixels that are hidden by the advancing ball in the next frame—are used. The occlusion map is determined by a sub-module similar to the IMVF sub-modules, but instead of obtaining S channels per pixel, only two channels are output, where the occlusion map is one of the channels.

An example of a coarse CNN with 3 pyramid levels is shown in FIG. 3. Referring now to FIG. 3, two consecutive input frames given at three resolutions are shown on the left. The three resolutions are indicated by Level 0, Level 1 and Level 2. Note that this number of resolution levels is exemplary and non-limiting, and there may be more or fewer resolution levels in other embodiments. Each pair of input frames is input into the Siamese layers of a feature extraction sub-network 31, which output a pair of feature maps for each pair of input frames. The pair of features maps output by the Siamese layers are input to encoder-decoder sub-networks 32, which output processed feature maps that are provided to the feature fusion sub-network 33. The feature fusion sub-network 33 merges the outputs of the encoder-decoder sub-networks 32 to yield the coarse IMVF and the occlusion map 34. The estimated IMVF, overlaid on the output image, and occlusion map are shown on the right.

Occlusion-Aware Registration

Figure 4:
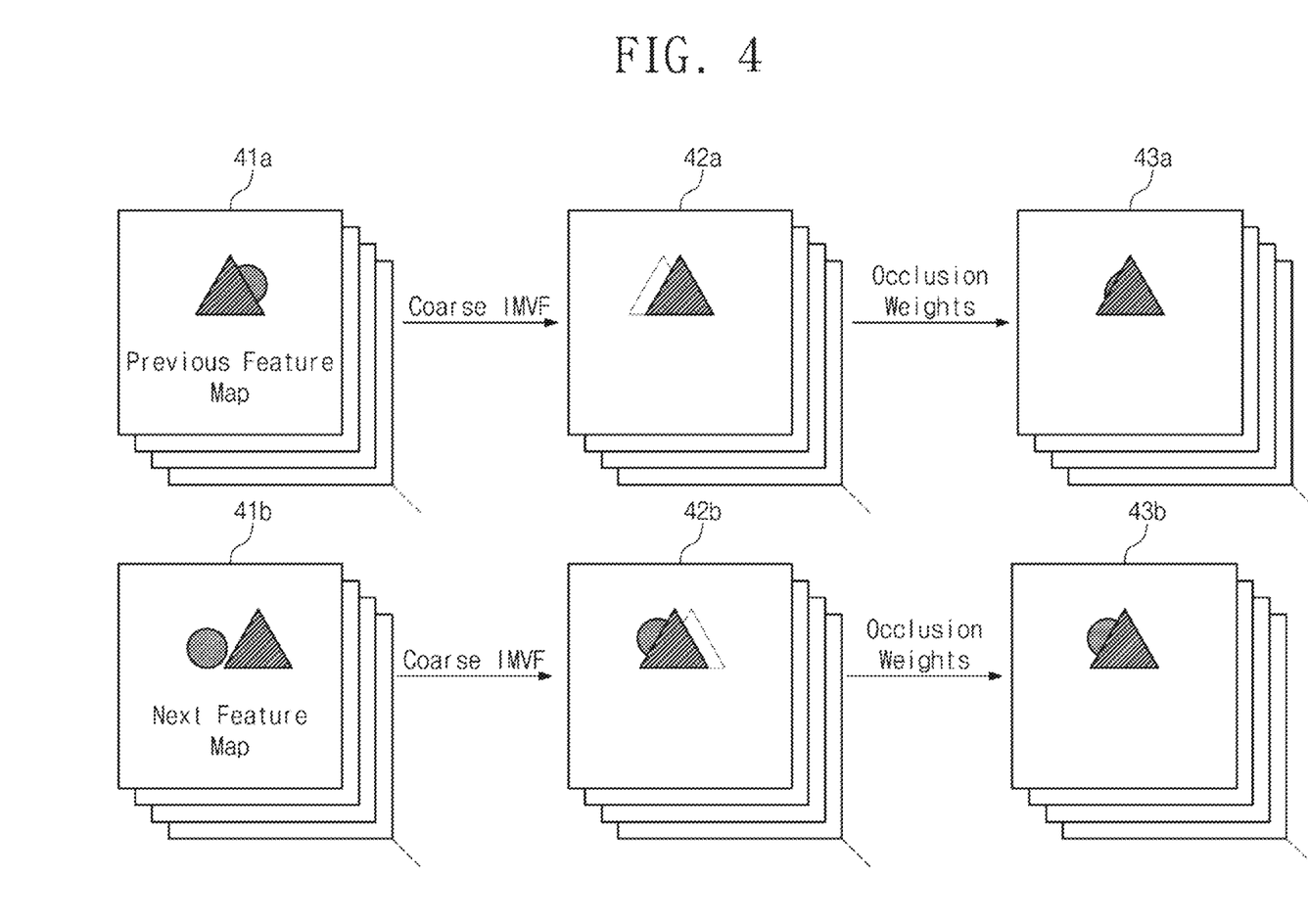
FIG. 4 illustrates an occlusion-aware registration module, according to embodiments of the disclosure.

According to an embodiment, a registration module receives a pair of input feature maps, extracted by a convolution layer of the Siamese sub-network of a given pyramid level. Using the coarse IMVF output from the feature fusion sub-network, the registration module warps each of these feature maps to be aligned with the pixel locations of the output frame, and yields a registered previous feature map and a registered next feature map.

According to an embodiment, an IMVF includes two 2D maps of horizontal and vertical shifts directed from the output frame to the next frame. In a registration module these shifts are used to generate two versions of warped input features:

(1) The opposite values of these shifts are used to warp the input features from the previous frame to the locations of the output frame.
(2) These shifts are used "as is" to warp the input features from the next frame to the locations of the output frame.

FIG. 4 illustrates an exemplary flow of an occlusion-aware registration module according to an embodiment. Due to occlusions, some regions in an output frame can be synthesized only from one of the input frames. This means that in the warped feature maps there are regions with very low confidence. To handle these regions, according to embodiments, a following occlusion-aware compensation can be applied. Referring to the top row of FIG. 4, replace occluded regions (white holes) in the warped feature maps of the previous frame 42*a* with the warped features of the next frame at these locations 42*b* to yield output frame 43*a*, and referring to the bottom row of FIG. 4, replace occluded regions in the warped feature maps of the next frame 42*b* with the warped features of the previous frame at these locations 42*a* to yield output frame 43*b*. After this compensation, the registered previous and next feature maps will coincide on the occluded pixel location, which leaves no further room for motion refinement in these locations.

Refinement CNN

Figure 5:
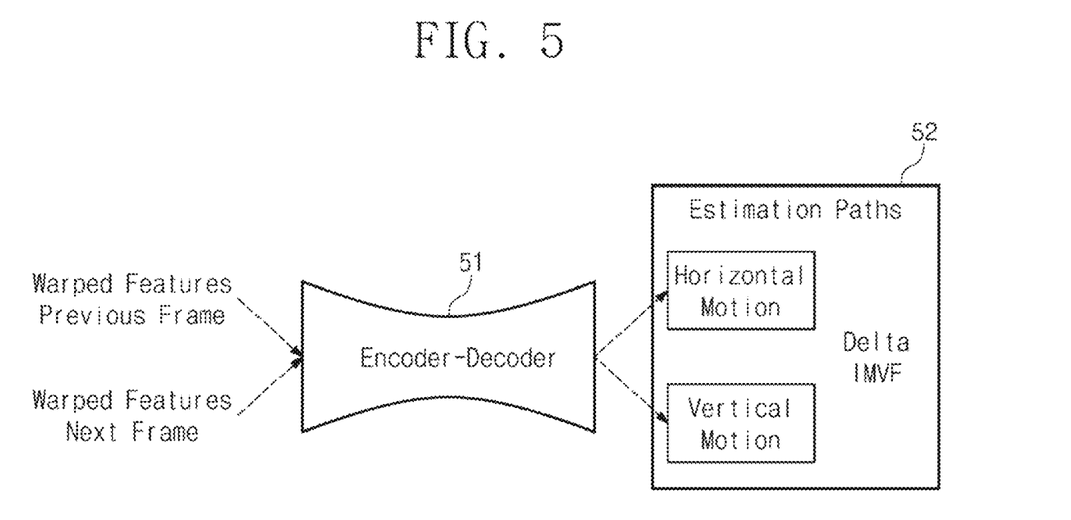
FIG. 5 shows an example of a Refinement CNN, according to embodiments of the disclosure.

An example of a refinement CNN according to an embodiment that receives registered features maps from one level of the image pyramids is shown in FIG. 5. A refinement CNN uses the two coarsely registered input features as inputs, concatenates them, and then processes them similarly to the coarse CNN. Similar to the coarse CNN, a refinement CNN according to an embodiment includes a horizontal sub-module and a vertical sub-module. Referring to FIG. 5, a refinement CNN receives the pair of registered feature maps produced by the registration module. These features are concatenated and processed by an encoder-decoder sub-network 51 similar to the coarse CNN, resulting in a new set of feature maps with spatial resolution downscaled by Q with respect to the full resolution. An exemplary, non-limiting value of Q is Q=4. The decoder output and the coarse IMVF is then provided to estimation sub-network layers 52 that estimate for each P×P block in the output images corrections to the horizontal and vertical components of the coarse IMVF to output a refined IMVF. For example, in some embodiments, P=Q. A refined CNN according to an embodiment yields the IMVF correction using the coarsely registered input frames, and not directly from the coarse IMVF. The IMVF corrections are then summed with a resized version of the coarse IMVF to create the final, refined IMVF. The resizing operation aligns the outputs estimated by the coarse and refinement CNNs to the same resolution. In the example where K=8, L=8, P=4 and Q=4, an up-scaling operation with factor 2 at each axis is used.

MC-FI Module

An MC-FI module according to an embodiment uses the two full resolution input frames, the refined IMVF and the occlusion map to create a new interpolated frame at a given timestamp. According to an embodiment, a MC-FI module generates the output frame from the input frames using the IMVF similar to how the registration module warps each of these feature maps, where the occlusion weights are used for blending the two input frames. The MC-FI module first warps the input frames according to the IMVF, similar to the first step of a registration module according to an embodiment. Then the MC-FI module performs a weighted blending of the warped images using the occlusion weights. Since the IMVF and occlusion weights are estimated per each K×K block in the output image, the MC-FI module includes a de-blocking mechanism which removes blockiness artifacts from motion boundaries. More specifically, the MC-FI module performs a weighted averaging of interpolated pixels obtained using the estimates from neighboring blocks.

Algorithmic Flow

Figure 6:
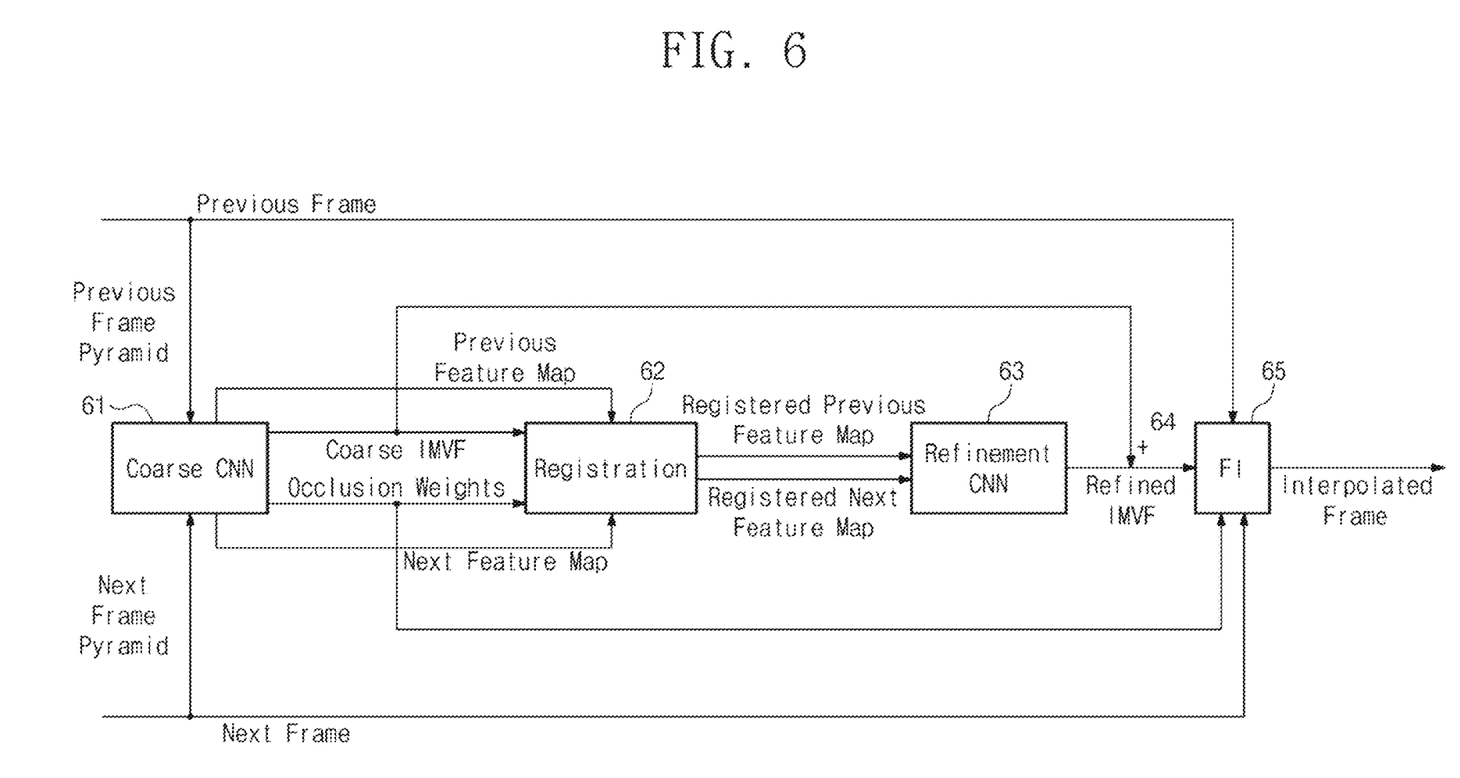
FIG. 6 shows an overview of a CNN-based framework for VFI, according to embodiments of the disclosure.

A flow of a CNN-based framework according to an embodiment for VFI is illustrated in FIG. 6. Referring to the figure, according to an embodiment, a whole algorithmic flow includes:

1. Receiving a pair of consecutive input frames;
2. Generating a pyramid representation from these frames;
3. Providing the pairs of image pyramids to a first, hierarchical coarse CNN 61 that outputs a pair of feature maps for each pair of image pyramids and estimates a coarse IMVF and an occlusion map;
4. Registering, by a registration module 62, pairs of feature maps generated by coarse CNN 61 according to the IMVF and occlusion map estimated by the coarse CNN 61;
5. Providing the coarse IMVF and the registered pairs of feature maps to a second refinement CNN 63 that estimates the corrections to the coarse IMVF;
6. Summing, by an adder 64, the corrections to the coarse IMVF with an up-scaled version of the coarse IMVF to create the final IMVF; and
7. Providing the original pair of input frames, along with the final IMVF and the estimated occlusion map, to an MC-FI module 65 that produces the synthesized middle frame.

Note that: (1) the coarse CNN can receive one or more levels from the image pyramids; and (2) the registration module and the refinement CNN can be bypassed if fast inference is preferred over high accuracy.

Effects

Methods according to embodiments can incorporate deep learning modules into a VFI framework to replace some or all of the conventional hand engineered components. The pre-trained neural networks can:
1. more accurately estimate occluded regions and complex motion; and
2. are more robust to abrupt brightness changes.

These features can improve frame interpolation quality, thus effectively reducing the level of halo, ghost and break-up artifacts, typically observed in standard VF methods.

In addition, methods according to embodiments can learn from examples to perform the following tasks:
1. Directly estimating the IMVF from the deep feature space instead of computing forward and backward MVFs and then interpolating them to a desired output grid.
2. Directly estimating the occlusion map from the deep feature space instead of estimating it by hand engineered analysis of the forward and backward MVFs.

Methods according to embodiments can balance between using pre-trained neural networks and conventional hand engineered modules in a VFI solution. A good balance between the two types of components, along with careful design of the neural network architecture, can facilitate an efficient implementation of a high quality VFI on platforms such as GPUs, neural processors and dedicated hardware.

Embodiments of the disclosure can be used for various applications that rely on VFI:
1. Frame rate up-conversion for reducing display motion blur and judder in LED/LCD displays;
2. Frame recovery in video coding and streaming;
3. Increasing frame rate in video conference calls;
4. Slow motion effects; and
5. Synthesizing novel views.

In scenarios like (3) and (4), the motion and occlusion might be too complex and the image quality requirement might be too strict for conventional VF approaches to handle. A system that uses CNN-based techniques according to embodiments can better cope with the challenges faced in these scenarios.

Examples

Figure 7:
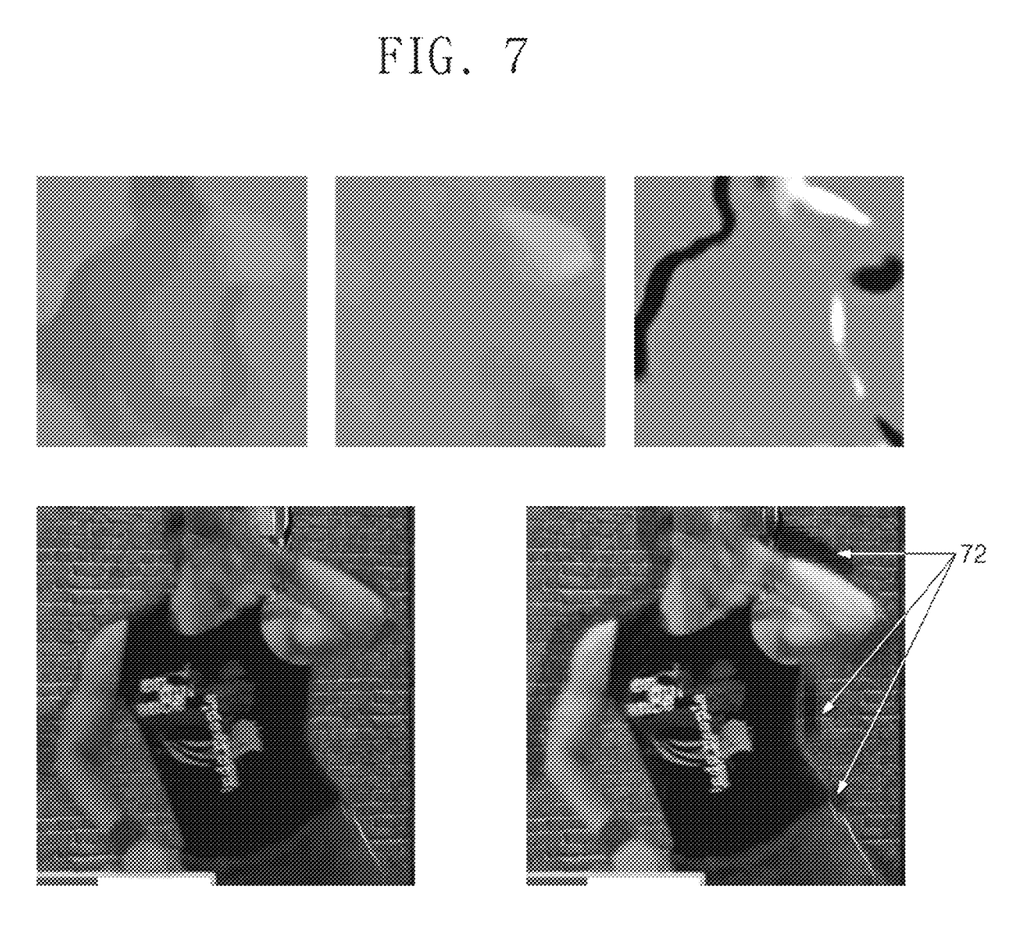
FIG. 7 illustrates results of a hierarchical Coarse CNN and a MC-FI module on the pair of frames from FIG. 1, according to embodiments of the disclosure.
Figure 8:
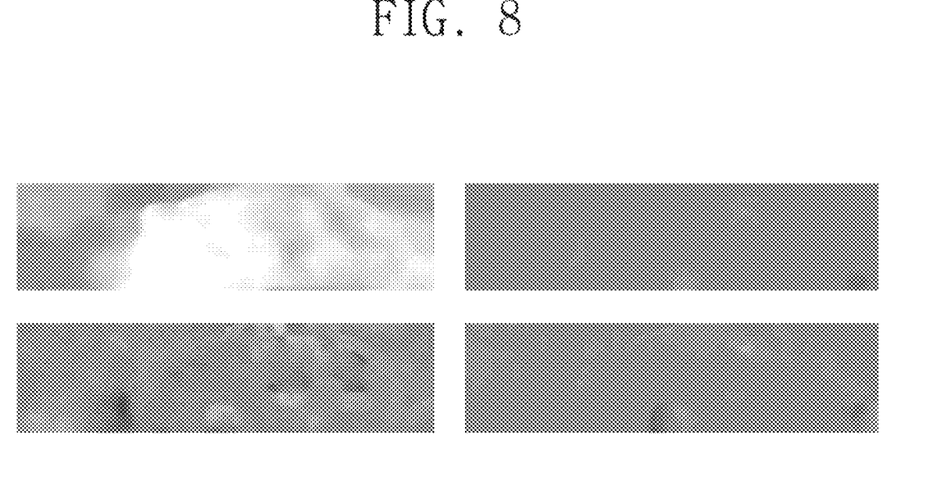
FIG. 8 illustrates results of a Coarse CNN and a Refinement CNN on the pair of frames from FIG. 2, according to embodiments of the disclosure.
Figure 9:
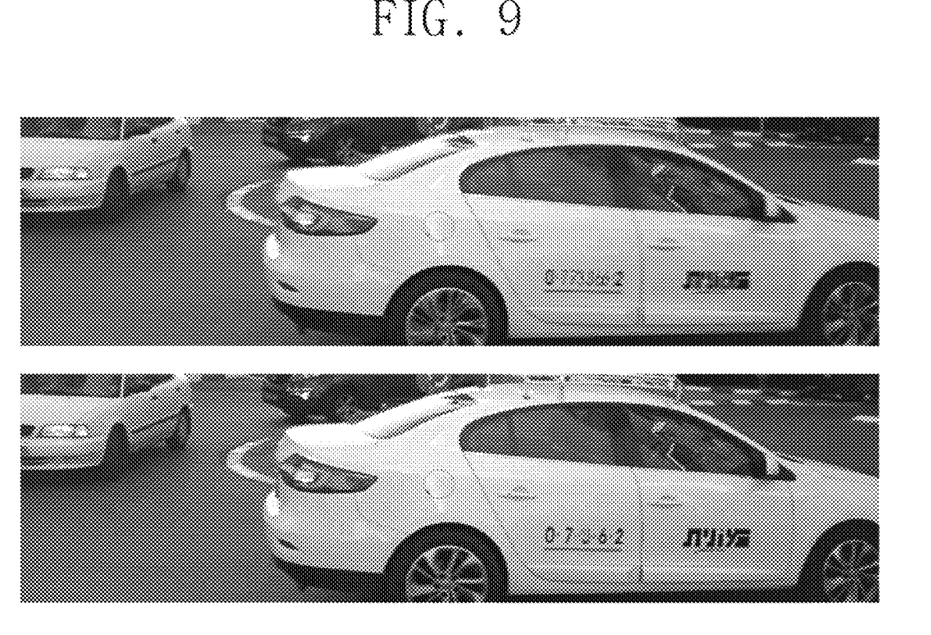
FIG. 9 illustrates results of a CNN-based VFI solution on a pair of frames from FIG. 2, according to embodiments of the disclosure.

FIGS. 7-9 illustrate results obtained by a CNN-based solution for VF, according to embodiments of the disclosure.

FIG. 7 depicts the outputs produced by the hierarchical Coarse CNN and the MC-F module according to an embodiment when applied to the pair of input frames shown in FIG. 1, including the estimated IMVF and occlusion map. It also shows the middle frame synthesized by the MC-FI module using these estimations. The top row shows, from left to right: the estimated horizontal and vertical components of the IMVF and the estimated occlusion map. The bottom row shows, from left to right: the estimated MVF overlaid on the synthesized frame and the estimated occlusion map overlaid on the synthesized frame. Note that regions 72 depict a 'closing' occlusion type, and the rest of the pixel locations are un-occluded.

Results for the pair of input frames with complex motion shown in FIG. 2 are shown next. FIG. 8 depicts the coarse IMVF obtained by a Coarse CNN that uses only the finest level of the image pyramids (full resolution) and the estimated corrections to the IMVF produced by the Refinement CNN. The top row shows, from left to right: the horizontal and vertical components of the IMVF, which were estimated by a Coarse CNN that uses only the finest level of the image pyramids (full resolution). The bottom row shows, from left to right: the horizontal and vertical components of the delta IMVF, which were estimated by the Refinement CNN. It can be seen that the second CNN detected inaccuracies in the IMVF across the front car, and also recovered secondary motion of the wheels of this car.

FIG. 9 illustrates results of a CNN-based VFI solution on the pair of frames from FIG. 2, and displays the middle frame synthesized by two possible choices of the suggested framework: (i) Coarse CNN+MC-FI; and (ii) Coarse CNN+Registration+Refinement CNN+MC-FI (the entire pipeline). The top row shows a synthesized frame generated by VFI solution that includes a Coarse CNN+MC-FI. The bottom row shows a synthesized frame generated by an entire pipeline of a VFI solution according to an embodiment (Coarse CNN+Registration+Refinement CNN+MC-FI). When comparing these two frame results, it is easy to observe the quality improvements achieved by using a full pipeline: the text appears much clearer, the boundaries of the car parts are sharper and the level of details in the wheels is improved.

System Implementations

It is to be understood that embodiments of the present disclosure can be implemented in various forms of hardware, software, firmware, special purpose processes, or a combination thereof. In some embodiments, the present disclosure can be implemented in hardware as an application-specific integrated circuit (ASIC), or as a field programmable gate array (FPGA). In other embodiments, the present disclosure can be implemented in software as an application program tangible embodied on a computer readable program storage device. The application program can be uploaded to, and executed by, a machine comprising any suitable architecture.

Figure 10:
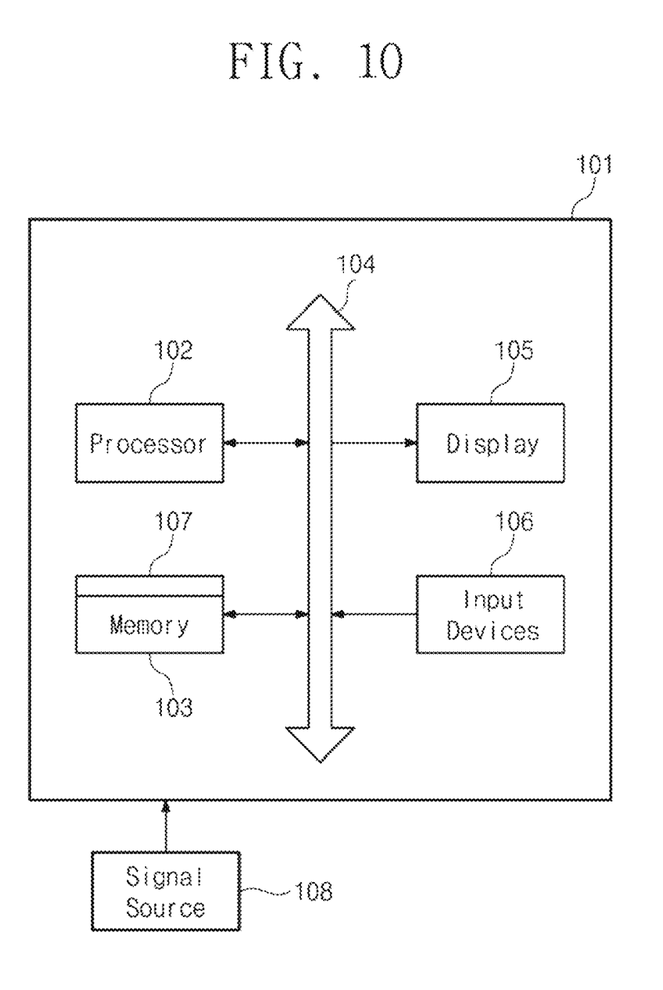
FIG. 10 is a block diagram of a system that implements a method for using CNNs to synthesize middle non-existing frames from pairs of input frames in a given video, according to an embodiment of the disclosure.

FIG. 10 is a block diagram of a system that implements a method for synthesizing middle non-existing frames from pairs of input frames in a given video using CNNs according to an embodiment of the disclosure. Referring now to FIG. 10, a computer system 101 for implementing the present invention can comprise, inter alia, a processor 102, a memory 103 and an input/output (I/O) interface 104. The computer system 101 is generally coupled through the I/O interface 104 to a display 105 and various input devices 106 such as a mouse and a keyboard. The support circuits can include circuits such as cache, power supplies, clock circuits, and a communication bus. The processor 102 may be a graphics processing unit (GPU), a neural processor or dedicated hardware (HW). A GPU and a neural processor are suitable for running a deep neural network, while a GPU and dedicated HW are good matches for the registration and MC-FI modules according to embodiments. The memory 103 can include random access memory (RAM), read only memory (ROM), disk drive, tape drive, etc., or a combinations thereof. The present disclosure can be implemented as a routine 107 that is stored in memory 103 and executed by the processor 102. As such, the computer system 101 is a general purpose computer system that becomes a specific purpose computer system when executing the routine 107 of the present invention. Alternatively, as described above, embodiments of the present disclosure can be implemented as an ASIC or FPGA 107 that is in signal communication with the processor 102.

The computer system 101 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A system that uses convolutional neural networks (CNNs) to synthesize middle non-existing frames from pairs of input frames in a given video, comprising:
    a coarse convolutional neural network (CNN) that receives a pair of images acquired at consecutive points of time, wherein the pair of images includes a previous image and a next image;
    a registration module connected to the coarse CNN;
    a refinement CNN connected to the registration module and the coarse CNN;
    an adder connected to the refinement CNN and the coarse CNN; and
    a motion-compensated frame interpolation (MC-FI) module connected to the adder and the coarse CNN,
    wherein the coarse CNN outputs a previous feature map and a next feature map from the previous image and the next image, a coarse interpolated motion vector field (IMVF) and an occlusion map from the pair of images, the registration module uses the coarse IMVF to warp the previous and next feature maps to be aligned with pixel locations of the IMVF frame, and outputs a registered previous feature map and a registered next feature map, the refinement CNN uses the registered previous feature map and a registered next feature map to correct the coarse IMVF, and the adder sums the coarse IMVF with the correction to the IMVF and outputs a final IMVF.

2. The system of claim 1, wherein the motion-compensated frame interpolation (MC-FI) module generates an interpolated frame corresponding to a time between the time points of the previous frame and the next frame by warping the previous image and the next image using the final IMVF and performing a weighted blending of the warped previous and next images using occlusion weights from the occlusion map.

3. The system of claim 1, wherein the coarse CNN receives the pair of images in a plurality of resolution levels, wherein the coarse CNN includes a feature extraction sub-network that generates a pair of feature maps that correspond to each image of the pair of images at each level of resolution, an encoder-decoder sub-network that concatenates the pair of feature maps at each level of resolution into a single feature map and processes the single feature map to produce a new feature map with downscaled spatial resolution, a fusion sub-network that merges the new single feature maps at each level of resolution into a single merged feature map by performing a weighted average of the feature maps for each level of resolution wherein the weights are learned in a training phase and differ for each pixel, and an estimation sub-network that outputs horizontal and vertical components of the coarse IMVF and an occlusion map, and
    wherein the feature extraction sub-network includes Siamese layers.

4. The system of claim 3, wherein the estimation sub-network includes a horizontal sub-module, a vertical sub-module and an occlusion map sub-module, wherein each sub-module receives the merged feature map output from the fusion sub-network,
    wherein the horizontal and vertical sub-modules respectively output a horizontal probability map and vertical probability map with S probability values per pixel in each probability map, wherein each probability value represents a probability for a motion vector to be one of S displacement values for that pixel,
    wherein the horizontal and vertical sub-modules respectively calculate a first moment of the probability values for each pixel to determine expected horizontal and vertical components for each pixel, wherein the pairs of expected horizontal and vertical components for each pixel comprise the coarse IMVF.

5. The system of claim 4, wherein the occlusion map sub-module outputs the occlusion map, which comprises per-pixel weights for performing a weighted average between the previous image and the next image.

6. The system of claim 3, wherein the refinement CNN includes an encoder-decoder sub-network that concatenates the registered previous feature map and the registered next feature map and outputs a new set of feature maps with spatial resolution resized with respect to a full resolution of the previous image and the next image, and an estimation sub-network that estimates corrections to the horizontal and vertical components of the coarse IMVF for each block in the registered next and previous feature maps to output the corrected IMVF.

7. The system of claim 6, wherein the estimation sub-network includes a horizontal sub-module and a vertical sub-module,
    wherein the horizontal and vertical sub-modules respectively output a horizontal probability map and vertical probability map with S probability values per pixel in each probability map, wherein each probability value represents a probability for a motion vector to be one of S displacement values for that pixel,
    wherein the horizontal and vertical sub-modules respectively calculate a first moment of the probability values for each pixel to determine expected horizontal and vertical components for each pixel, wherein the pairs of expected horizontal and vertical components for each pixel comprise the correction to the IMVF.

8. A method of using convolutional neural networks (CNNs) to synthesize middle non-existing frames from pairs of input frames in a given video, comprising the steps of:
    receiving a pyramid representation of a pair of consecutive input frames, wherein the pair of consecutive input frames includes a previous image and a next image, wherein the pyramid representation includes a plurality of pairs of input frames, each at a different spatial resolution level;
    generating a pair of feature maps from each resolution level of the pyramid representation and estimating a coarse interpolated motion vector field (IMVF) and an occlusion map from each pair of feature maps;
    registering pairs of feature maps at the same resolution level according to the coarse IMVF and the occlusion map by warping each feature map of the pair of feature maps to be aligned with pixel locations of the coarse IMVF and outputting a registered previous feature map and a registered next feature map;

correcting the coarse IMVF using the registered previous feature map and the registered next feature map to generate a correction to the IMVF;

adding the correction to the IMVF to the coarse IMVF to generate a refined IMVF; and producing a synthesized middle frame from the pair of consecutive input frames, the refined IMVF and the occlusion map.

9. The method of claim 8, wherein generating a pair of feature maps comprises generating a pair of features maps for each of the plurality of pairs of input frames at each spatial resolution, wherein each pair of features maps has a spatial resolution downscaled with respect to a resolution of the pair of input frames;

concatenating the feature maps at each resolution level and processing the concatenated feature maps to generate a new set of feature maps with downscaled spatial resolution with respect to a resolution of the pair of consecutive input frames, merging the new set of feature maps for all spatial resolution levels into a single merged feature map by performing a weighted average of the feature maps for each level of resolution wherein the weights are learned in a training phase and differ for each pixel; and estimating for each block in the merged feature map horizontal and vertical components of the coarse IMVF, and an occlusion map, wherein the occlusion map comprises per-pixel weights for performing a weighted average between the previous image and the next image.

10. The method of claim 9, wherein estimating horizontal and vertical components of the coarse IMVF comprises:

generating a horizontal probability map and vertical probability map with S probability values per pixel in each probability map, wherein each probability value represents a probability for a motion vector to be one of S displacement values for that pixel, calculating a first moment of the probability values for each pixel to determine expected horizontal and vertical components for each pixel, wherein the pairs of expected horizontal and vertical components for each pixel comprise the coarse IMVF.

11. The method of claim 8, wherein the coarse IMVF includes two 2D maps of horizontal and vertical shifts directed from the IMVF to the next frame, wherein registering pairs of feature maps comprises using the opposite values of these shifts to warp features from the previous frame to locations of an output frame, and using the horizontal and vertical shifts as is to warp the input features from the next frame to the locations of the output frame.

12. The method of claim 11, wherein registering pairs of feature maps further comprises:

when the registered previous feature map has an occluded region, replacing the occluded region in the registered previous feature map with a corresponding region of the registered next feature map, and when the registered next feature map has an occluded region, replacing the occluded region in the registered next feature map with a corresponding region of the registered previous feature map.

13. The method of claim 8, wherein correcting the coarse IMVF comprises:

concatenating features of the registered previous feature map and the registered next feature map and processing the concatenated feature maps to generate a new set of feature maps with spatial resolution resized with respect to the full resolution; and estimating for each block in the coarse IMVF corrections to the horizontal and vertical components of the coarse IMVF to generate a correction to the IMVF.

14. The method of claim 8, wherein producing a synthesized middle frame comprises:

warping the pair of consecutive input frames according to the refined IMVF; and performing a weighted blending of the pair of warped images using the occlusion weights to generate the synthesized middle frame.

15. The method of claim 14, further comprising removing blockiness artifacts from motion boundaries by performing a weighted averaging of interpolated pixels in the synthesized middle frame using estimates from neighboring blocks.

16. A non-transitory program storage device readable by a computer, tangibly embodying a program of instructions executed by the computer to perform the method steps for using convolutional neural networks (CNNs) to synthesize middle non-existing frames from pairs of input frames in a given video, comprising the steps of:

receiving a pyramid representation of a pair of consecutive input frames, wherein the pair of consecutive input frames includes a previous image and a next image, wherein the pyramid representation includes a plurality of pairs of input frames, each at a different spatial resolution level;

generating a pair of feature maps from each resolution level of the pyramid representation and estimating a coarse interpolated motion vector field (IMVF) and an occlusion map from each pair of feature maps;

registering pairs of feature maps at the same resolution level according to the coarse IMVF and the occlusion map by warping each feature map of the pair of feature maps to be aligned with pixel locations of the coarse IMVF and outputting a registered previous feature map and a registered next feature map;

correcting the coarse IMVF using the registered previous feature map and the registered next feature map to generate a correction to the IMVF;

adding the correction to the IMVF to the coarse IMVF to generate a refined IMVF; and producing a synthesized middle frame from the pair of consecutive input frames, the refined IMVF and the occlusion map.

17. The computer readable program storage device of claim 16, wherein generating a pair of feature maps comprises generating a pair of features maps for each of the plurality of pairs of input frames at each spatial resolution, wherein each pair of features maps has a spatial resolution downscaled with respect to a resolution of the pair of input frames;

concatenating the feature maps at each resolution level and processing the concatenated feature maps to generate a new set of feature maps with downscaled spatial resolution with respect to a resolution of the pair of consecutive input frames, merging the new set of feature maps for all spatial resolution levels into a single merged feature map by performing a weighted average of the feature maps for each level of resolution wherein the weights are learned in a training phase and differ for each pixel; and estimating for each block in the merged feature map horizontal and vertical components of the coarse IMVF, and an occlusion map, wherein the occlusion map comprises per-pixel weights for performing a weighted average between the previous image and the next image, wherein estimating horizontal and vertical components of the coarse IMVF comprises:

generating a horizontal probability map and vertical probability map with S probability values per pixel in each probability map, wherein each probability value represents a probability for a motion vector to be one of S displacement values for that pixel, calculating a first moment of the probability values for each pixel to determine expected horizontal and vertical components for each pixel, wherein the pairs of expected horizontal and vertical components for each pixel comprise the coarse IMVF.

18. The computer readable program storage device of claim 16, wherein the coarse IMVF includes two 2D maps of horizontal and vertical shifts directed from the IMVF to the next frame, wherein registering pairs of feature maps comprises using the opposite values of these shifts to warp features from the previous frame to locations of an output frame, and using the horizontal and vertical shifts as is to warp the input features from the next frame to the locations of the output frame, when the registered previous feature map has an occluded region, replacing the occluded region in the registered previous feature map with a corresponding region of the registered next feature map, and when the registered next feature map has an occluded region, replacing the occluded region in the registered next feature map with a corresponding region of the registered previous feature map.

19. The computer readable program storage device of claim 16, wherein correcting the coarse IMVF comprises:

concatenating features of the registered previous feature map and the registered next feature map and processing the concatenated feature maps to generate a new set of feature maps with spatial resolution resized with respect to the full resolution; and estimating for each block in the coarse IMVF corrections to the horizontal and vertical components of the coarse IMVF to generate a correction to the IMVF.

20. The computer readable program storage device of claim 8, wherein producing a synthesized middle frame comprises:

warping the pair of consecutive input frames according to the refined IMVF;

performing a weighted blending of the pair of warped images using the occlusion weights to generate the synthesized middle frame, and removing blockiness artifacts from motion boundaries by performing a weighted averaging of interpolated pixels in the synthesized middle frame using estimates from neighboring blocks.

* * * * *